United States Patent
Tsuji

(10) Patent No.: US 10,140,503 B2
(45) Date of Patent: Nov. 27, 2018

(54) SUBJECT TRACKING APPARATUS, CONTROL METHOD, IMAGE PROCESSING APPARATUS, AND IMAGE PICKUP APPARATUS

(71) Applicant: CANON KABUSHIKI KAISHA, Tokyo (JP)

(72) Inventor: Ryosuke Tsuji, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 151 days.

(21) Appl. No.: 15/168,608

(22) Filed: May 31, 2016

(65) Prior Publication Data
US 2016/0364604 A1    Dec. 15, 2016

(30) Foreign Application Priority Data

Jun. 12, 2015    (JP) .................................. 2015-119267

(51) Int. Cl.
*G06K 9/00* (2006.01)
*G06T 7/246* (2017.01)
(Continued)

(52) U.S. Cl.
CPC ....... *G06K 9/00241* (2013.01); *G06K 9/6212* (2013.01); *G06K 9/6255* (2013.01);
(Continued)

(58) Field of Classification Search
CPC ............. G06K 9/00241; G06K 9/6212; G06K 9/6255; G06K 2009/3291;
(Continued)

(56) References Cited

U.S. PATENT DOCUMENTS

| 7,573,505 B2 | 8/2009 | Kawaguchi et al. |
| 2011/0033086 A1* | 2/2011 | Kubota .............. H04N 5/23229 382/103 |

(Continued)

FOREIGN PATENT DOCUMENTS

| JP | 2001-060269 A | 3/2001 |
| JP | 2004-348273 A | 12/2004 |
| JP | 2005-318554 A | 11/2005 |

*Primary Examiner* — Amara Abdi
(74) *Attorney, Agent, or Firm* — Carter, DeLuca, Farrell & Schmidt, LLP

(57) ABSTRACT

The subject tracking apparatus comprises: a first registering unit configured to register a partial area as a template indicative of a subject in one image of supplied images; a first matching unit configured to estimate a subject area by collating a partial area in newly supplied images with the template registered by the first registering unit; a second registering unit configured to register a histogram generated based on a pixel value of a partial area indicative of the subject in one image of supplied images; a second matching unit configured to estimate a subject area by collating a histogram of a partial area in newly supplied images with the histogram registered by the second registering unit; and a tracking area determination unit configured to determine a tracking area based on estimation results by the first matching unit and the second matching unit. The first registering unit and the second registering unit allow at least one of the template and the histogram previously registered to be updated, and the update for the registration of the template by the first registering unit is more frequently than that for the registration of the histogram by the second registering unit.

19 Claims, 8 Drawing Sheets

(51) Int. Cl.
*G06K 9/62* (2006.01)
*G06K 9/32* (2006.01)

(52) U.S. Cl.
CPC ...... *G06T 7/248* (2017.01); *G06K 2009/3291* (2013.01); *G06T 2207/10016* (2013.01); *G06T 2207/30201* (2013.01)

(58) Field of Classification Search
CPC . G06T 2207/10016; G06T 2207/30201; G06T 7/248
See application file for complete search history.

(56) References Cited

U.S. PATENT DOCUMENTS

| | | | | |
|---|---|---|---|---|
| 2011/0150280 | A1* | 6/2011 | Tsuji | G06T 7/248 382/103 |
| 2014/0267821 | A1* | 9/2014 | Masuura | H04N 7/18 348/222.1 |
| 2016/0006936 | A1* | 1/2016 | Hattori | H04N 5/23267 382/166 |
| 2016/0335780 | A1 | 11/2016 | Tsuji | |

\* cited by examiner

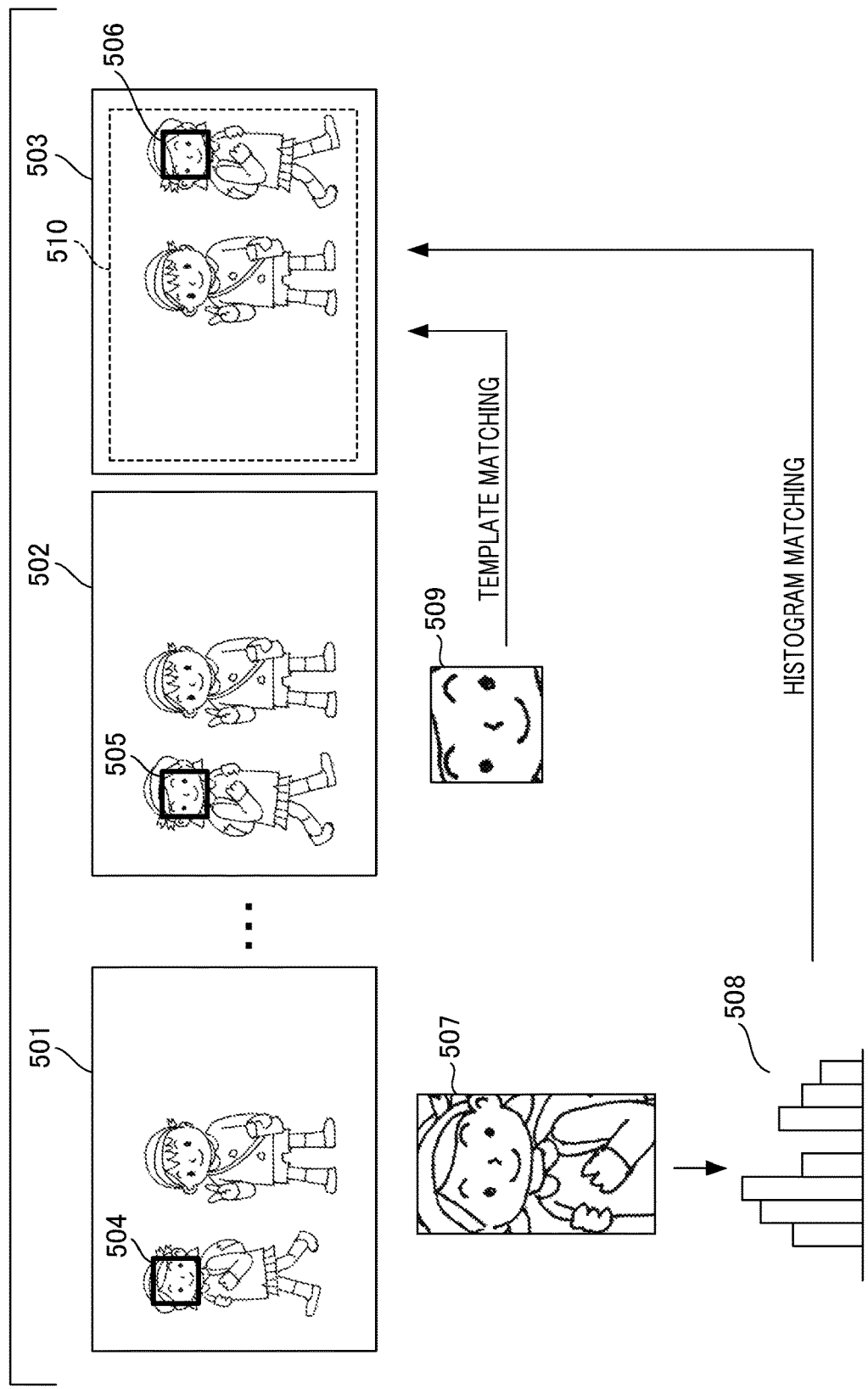

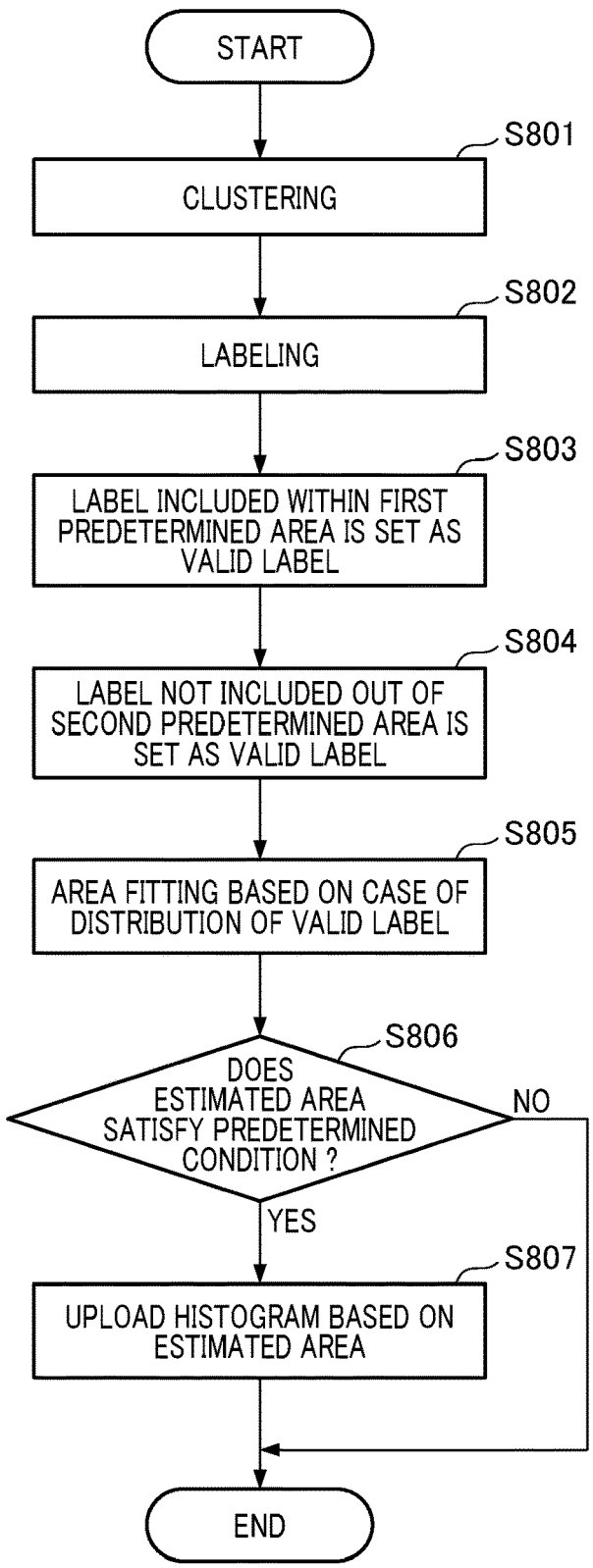

SUBJECT TRACKING APPARATUS, CONTROL METHOD, IMAGE PROCESSING APPARATUS, AND IMAGE PICKUP APPARATUS

BACKGROUND OF THE INVENTION

Field of the Invention

The present invention relates to a subject tracking apparatus, a control method, an image processing apparatus, and an image pickup apparatus, and more specifically, a subject tracking apparatus for tracking a subject included in images which are sequentially supplied.

Description of the Related Art

In recent years, a technique in which a particular subject is extracted from images supplied sequentially in a time series manner and then, the extracted subject is tracked has been very useful. For example, the technique has been used for specifying a human face region and a human body region in dynamic images. Such a technique can be used in a number of different fields, such as teleconferences, man-machine interfaces, security, monitoring systems for tracking any subjects, and image compression.

Also, in digital still cameras, digital video cameras and the like, there is a well-known technique for extracting and tracking any subject included in a photographing image, and thereby optimizing a focal point state and an exposure state with respect to the subject (see, Japanese Patent Laid-Open No. 2005-318554, Japanese Patent Laid-Open No. 2001-060269, and Japanese Patent Laid-Open No. 2004-348273).

For example, Japanese Patent Laid-Open No. 2005-318554 discloses an image pickup apparatus for detecting (extracting) and tracking, with respect to the face, a position of a face in a photographed image and imaging the face at optical exposure while fitting the face to a focal point. Tracking the detected face enables stable control in a time series manner.

Also, Japanese Patent Laid-Open No. 2001-060269 discloses a technique such that a certain subject is automatically tracked by utilizing a template matching. The template matching is a technique for registering a partial image as a template image by clipping an image area with a certain subject set as a target to be tracked, and estimating an area with the highest degree of similarity, or the least degree of difference relative to the template image, and tracking the certain subject.

Japanese Patent Laid-Open No. 2004-348273 discloses, in contrast to the template matching, a technique, referred to as a histogram matching, for utilizing a histogram with respect to the amount of characteristic for the matching, rather than image data itself. This is a technique for converting information indicative of a subject from image data into a histogram, registering the histogram, estimating an area capable of being converted into the histogram most similar to the registered histogram among the images, and tracking the certain subject.

However, while template matching is good at classification between subjects that are similar to each other, it is weak at classification when there are changes in the appearance because template matching uses patterns of the image data as the amount of characteristic. In contrast, histogram matching can realize robust tracking of the subject with respect to changes in the appearance, such as a change in the attitude of the subject, by converting information indicative of the subject from the image data into a histogram for the sake of ambiguity. However, it is weak at the classification between the similar subjects. In addition, it is difficult to use histogram matching simply in combination with the template matching because the properties thereof are different from each other.

SUMMARY OF THE INVENTION

The present invention provides a subject tracking apparatus capable of improving performance for tracking a subject, while combining histogram matching with template matching.

The subject tracking apparatus according to the present invention is a subject tracking apparatus that tracks a subject included in images that are sequentially supplied, the apparatus comprising: a first registering unit configured to register a partial area indicative of the subject in one image of the supplied images as a template; a first matching unit configured to estimate a subject area by collating a partial area in a newly supplied image with the template registered by the first registering unit; a second registering unit configured to generate a histogram based on a pixel value of a partial area indicative of the subject in one image of the supplied images and register the generated histogram; a second matching unit configured to estimate a subject area by collating a histogram of a partial area in a newly supplied image with the histogram registered by the second registering unit; and a tracking area determination unit configured to determine a tracking area based on estimation results by the first matching unit and the second matching unit; wherein the first registering unit and the second registering unit are allowed to update at least one of the template and the histogram previously registered; and wherein the update for the registration of the template by the first registering unit is more frequent than that for the registration of the histogram by the second registering unit.

According to the present invention, there can be provided the subject tracking apparatus capable of estimating the subject area with high precision and improving the performance for tracking the subject, while combining template matching with histogram matching.

Further features of the present invention will become apparent from the following description of exemplary embodiments (with reference to the attached drawings).

BRIEF DESCRIPTION OF THE DRAWINGS

FIG. 5 is a diagram illustrating a framework of a subject tracking.

FIG. 8 is a flowchart illustrating a flow for optimized processing in a histogram acquiring area.

DESCRIPTION OF THE EMBODIMENTS

Hereinafter, a description will be given of each preferred embodiment of the present invention with reference to the accompanying drawings and the like. The present invention can be applied to an image pickup apparatus such as a digital still camera, and a digital video camera.

Figure 1:
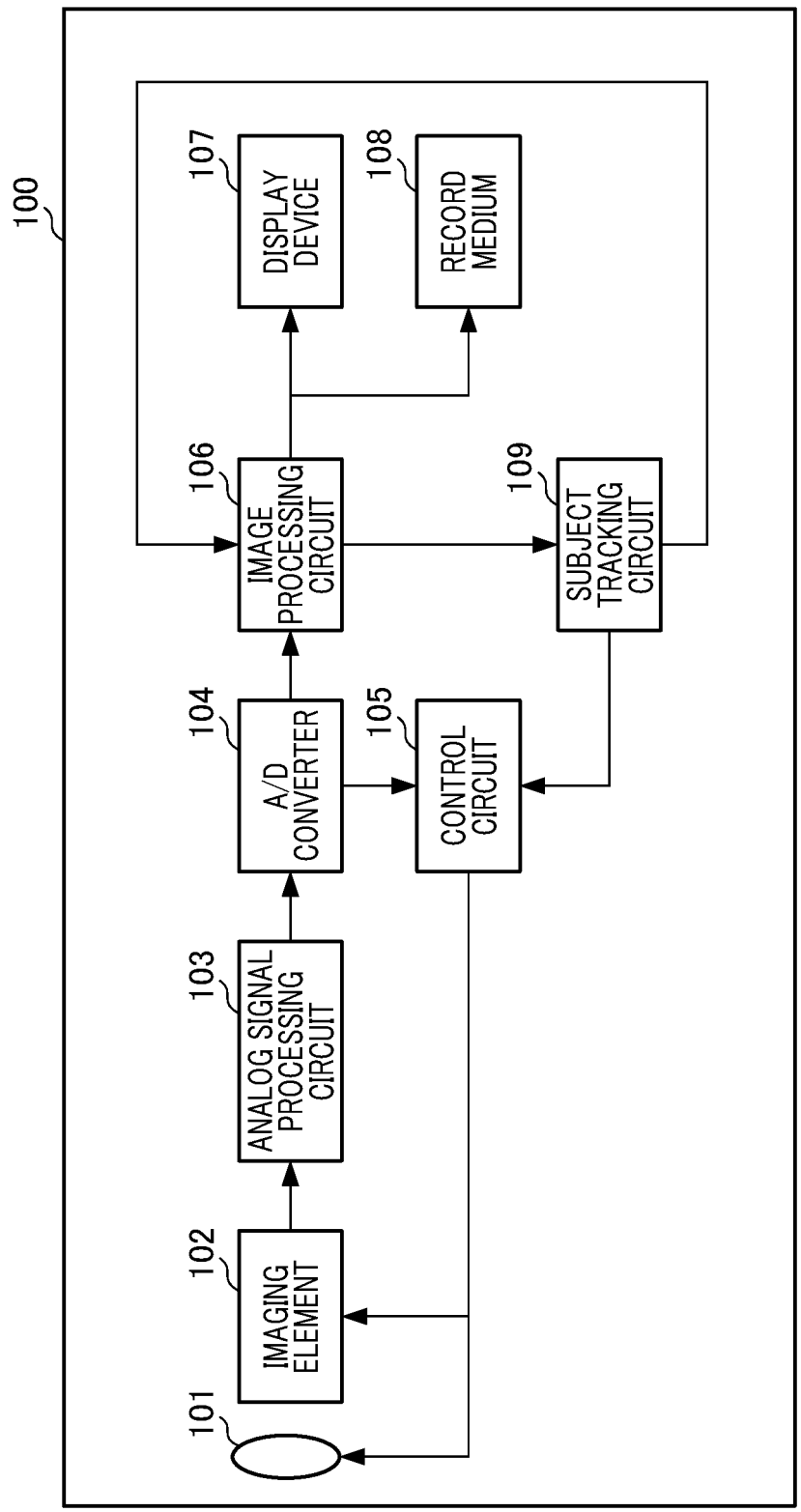
FIG. 1 is a block diagram illustrating a schematic configuration of an image pickup apparatus.

FIG. 1 is a block diagram illustrating a schematic configuration of an image pickup apparatus 100 according to an embodiment of the present invention. In the present embodiment, the image pickup apparatus 100 is embodied as a digital camera for capturing an image of a subject. Also, the image pickup apparatus 100 functions as a subject tracking apparatus for tracking the subject included in images supplied (input) sequentially in a time series manner.

The image pickup apparatus 100 comprises an imaging optical system 101, an imaging element 102, an analog signal processing circuit 103, an A/D converter 104, a control circuit 105, an image processing circuit 106, a display device 107, a record medium 108, and a subject tracking circuit 109.

Light indicative of the image of the subject is converged by the imaging optical system 101, and the converged light is incident to the imaging element 102 configured by a CCD image sensor, a CMOS image sensor, or the like. The imaging element 102 outputs an electric signal in pixel units, in accordance with the intensity of the incident light. In other words, the image of the subject formed by the imaging optical system 101 is photoelectrically converted. The electric signal output from the imaging element 102 is an analog image signal indicative of the image of the subject captured in the imaging element 102.

With respect to an image signal output from the imaging element 102, analog signal processing such as correlated double sampling (CDS) is performed by the analog signal processing circuit 103. The image signal output from the analog signal processing circuit 103 is converted into a digital data format by the A/D converter 104, and then input to the control circuit 105 and the image processing circuit 106.

The control circuit 105 is configured by a CPU, a microcontroller, and the like, which centrally controls the operation of the image pickup apparatus 100. The control circuit 105 controls imaging conditions such as a focal point state and an exposure state when the imaging is performed in the imaging element 102. More specifically, the control circuit 105 controls a focus controlling mechanism and an exposure controlling mechanism (neither of which is shown) of the imaging optical system 101, based on the image signal output from the A/D converter 104. For example, the focus controlling mechanism is an actuator and the like configured to allow a lens included in the imaging optical system 101 to be driven in an optical axis direction, while the exposure controlling mechanism is an actuator and the like configured to allow an aperture or a shutter to be driven. Also, the control circuit 105 controls reading of the imaging element 102, such as the output timing and the output pixels of the imaging element 102. The control circuit 105 deploys program codes stored in a ROM (Read Only Memory) in a work area of a RAM (Random Access Memory) and sequentially executes the deployed program codes, thereby controlling each unit of the image pickup apparatus 100.

The image processing circuit 106 performs image processing such as gamma correction, white balance processing, and the like, with respect to the image signal output from the A/D converter 104. Also, in addition to the normal image processing, the image processing circuit 106 has a function for performing image processing with information about the subject area in the image supplied from the subject tracking circuit 109 as described below.

The image signal output from the image processing circuit 106 is transmitted to the display device 107. The display device 107 is configured, for example, by an LCD, or an organic EL display, and displays the image signal. The images captured sequentially in a time series manner in the imaging element 102 are sequentially displayed in the display device 107, thereby allowing the display unit 107 to function as an electronic viewfinder (EVF). Also, the display device 107 displays the subject area including the subject tracked by the subject tracking circuit 109 as a rectangular shape and the like.

Also, the image signal output from the image processing circuit 106 is recorded on the record medium 108 (for example, a removable memory card, and the like). It is to be noted that the recording destination of the image signal may be a memory built in the image pickup apparatus 100 or an external device communicably connected via a communication interface (not shown).

The subject tracking circuit 109 tracks the subject included in the images (image signals) supplied sequentially in a time series manner (in other words, each of which has a different imaging time) from the image processing circuit 106. The subject tracking circuit 109 estimates the subject area from the sequentially supplied images, based on the pixel pattern or the histogram for the subject. The detail description of the subject tracking circuit 109 is described as below.

The control circuit 105 can use the information about the subject area supplied from the subject tracking circuit 109 in the control of the focus controlling mechanism and the exposure controlling mechanism as described above. More specifically, the focal point control using the contrast value of the subject area, or the exposure control using the luminance value of the subject area is performed. Thereby, in the image pickup apparatus 100, the imaging processing can be performed, taking into account the certain subject area in the photographed image.

Here, a detailed description will be given of the subject tracking circuit 109. The subject tracking circuit 109 functions as two types of matching unit. One is a matching unit configured to estimate the area with the high degree of similarity or the low degree of difference by collating the partial area of the supplied images with a partial image as the template indicative of the subject as a target and altering the collated partial area (hereinafter, referred to as "template matching"). The other is a matching unit configured to estimate the area with the high degree of similarity or the low degree of difference by collating the histogram of the partial area of the supplied images with the histogram of the partial area indicative of the subject as a target, and altering the collated partial area (hereinafter, referred to as "histogram matching"). Additionally, the subject area is determined based on a matching evaluation value in each estimation result. In the subject tracking according to an embodiment of the present invention, the tracking with high precision is performed by altering the area in which the amount of a characteristic for the tracking is acquired, and the update frequency, in accordance with the each property of the matching units.

Figure 2:
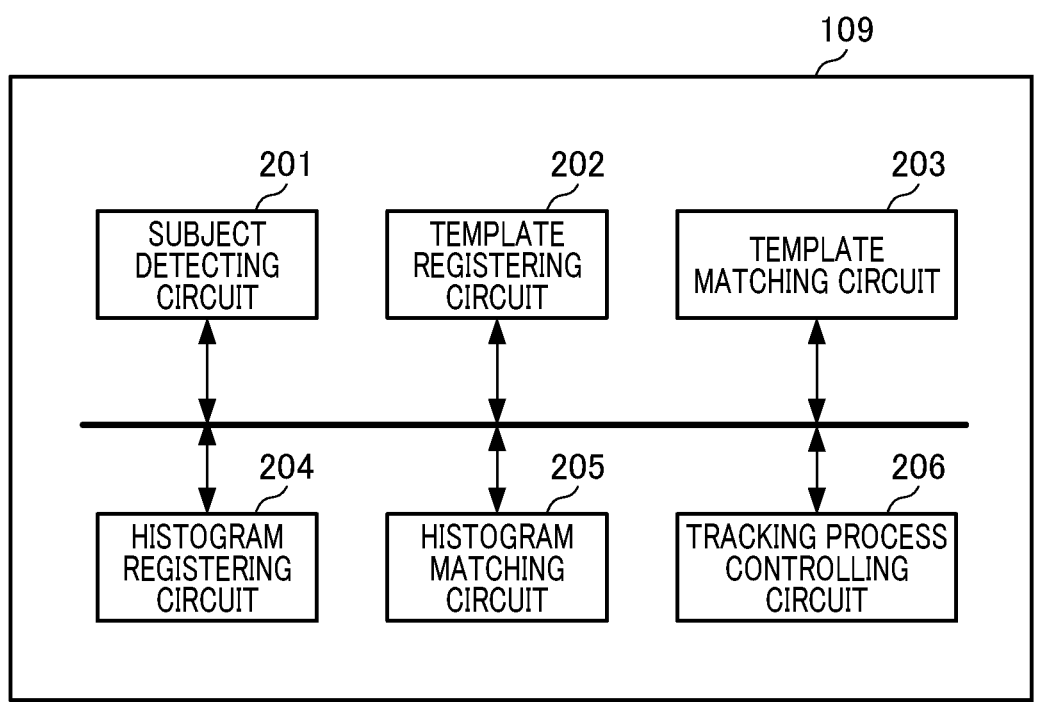
FIG. 2 is a block diagram illustrating a configuration of a subject tracking circuit.

FIG. 2 is a block diagram of the subject tracking circuit 109. The subject tracking circuit 109 is comprised of a subject detecting circuit 201, a template registering circuit 202, a template matching circuit 203, a histogram registering circuit 204, a histogram matching circuit 205, and a tracking process controlling circuit 206. Each block (circuit) from the subject detecting circuit 201 to the tracking process controlling circuit 206 is connected by a bus, thereby allowing each block to exchange the data.

The subject detecting circuit (subject detecting unit) 201 detects a predetermined subject as a target from the supplied images, and specifies the subject as the target to be tracked. A face of a person, for example, is representative of a target subject. In this case, the subject detecting circuit 201 specifies the face area of the person as the subject area, and sets the face area of the person as the target to be tracked. The detecting unit for the subject in the subject detecting circuit 201 may use a well-known detecting unit if the subject as a target to be detected is the face of the person. For example, the well-known techniques for detecting the face include a method for utilizing knowledge about the face (information about skin colors, parts such as eyes, a nose and a mouth), a method for constituting a discriminator for the detection of the face by a learning algorithm typified by a neural net, and the like. Also, in detecting the face, recognizing the face by combining the above methods in order to improve the rate of the recognition is generally performed. For example, there has been provided a method for detecting the face by utilizing the amount of a characteristic of the image and the wavelet transformation.

The template registering circuit (first registering unit) 202 registers the partial image indicative of the subject as the target, as a template that is a model expressing the characteristics of the subject. The template matching circuit (first matching unit) 203 estimates the areas with a high degree of similarity or a low degree of difference by collating partial areas of the supplied images with the template registered by the template registering circuit 202, and altering the collated partial area.

The histogram registering circuit (second registering unit) 204 registers the histogram of the partial image indicative of the subject as a target, as a model expressing the characteristics of the subject. The histogram matching circuit (second matching unit) 205 estimates the areas with a high degree of similarity or the a degree of difference by collating histograms of the partial areas of the supplied images with the histogram registered by the histogram registering circuit 204, and then, altering the collated partial area.

The tracking process controlling circuit (tracking area determination unit) 206 is configured by a CPU and the like, which controls the subject tracking process. The subject detecting circuit 201 to the histogram matching circuit 205 carry out the processing through the tracking process controlling circuit 206. The tracking process controlling circuit 206 determines the subject area from the evaluation values of the template matching circuit 203 and the histogram matching circuit 205. This determined subject area is set as output information of the subject tracking circuit 109.

Next, a description will be given of a method configured to determine the subject area. If there is the estimated area by the template matching adjacent to the estimated area by the histogram matching, the estimated area by the template matching is adopted as the subject area. If there is no estimated area by the template matching adjacent to the estimated area by the histogram matching, the estimated area by the histogram matching is adopted as the subject area. Also, the tracking process controlling circuit 206 performs the control of the partial area for acquiring the amount of a characteristic and the control of the update timing for the template registering circuit 202 and the histogram registering circuit 204. While a detailed description thereof will be described below, briefly, the tracking with high precision is performed by controlling the partial area and the update timing that differs in accordance with the property of the matching, in the template registering circuit 202 and the histogram registering circuit 204. In an embodiment of the present invention, although there is provided the control circuit dedicated for the tracking process, the tracking process controlling circuit 206 may be configured so as to be included in the control circuit 105.

Figure 3A:
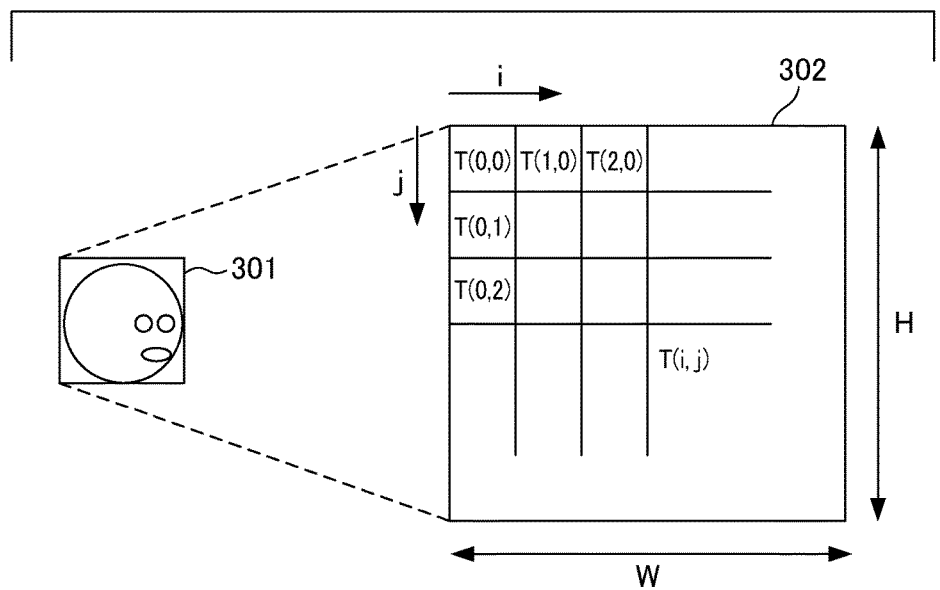
FIG. 3A and FIG. 3B are diagrams for illustrating a template matching.

Next, referring to FIG. 3A and FIG. 3B, a detailed description will be given of the template matching. FIG. 3A is a diagram illustrating an example of a subject model (template) in the template matching. A template 301 is the partial image indicative of the subject set as a target to be tracked (template), and sets the pixel pattern of this image as the amount of a characteristic. The amount of the characteristic 302 expresses the amount of the characteristic of each coordinate in a plurality of areas in the template 301, and in an embodiment of the present invention, the luminance signal of the pixel data is set as the amount of a characteristic. The amount of characteristic T(i, j) is expressed by a formula (1):

[formula 1]

$$T(i,j)=\{T(0,0),T(1,0),\ldots,T(W-1,H-1)\} \quad (1)$$

where the coordinate in the template area is represented by (i, j), and a number in the horizontal direction is set represented by W, and a number of pixels in the perpendicular direction is set represented by H.

Figure 3B:
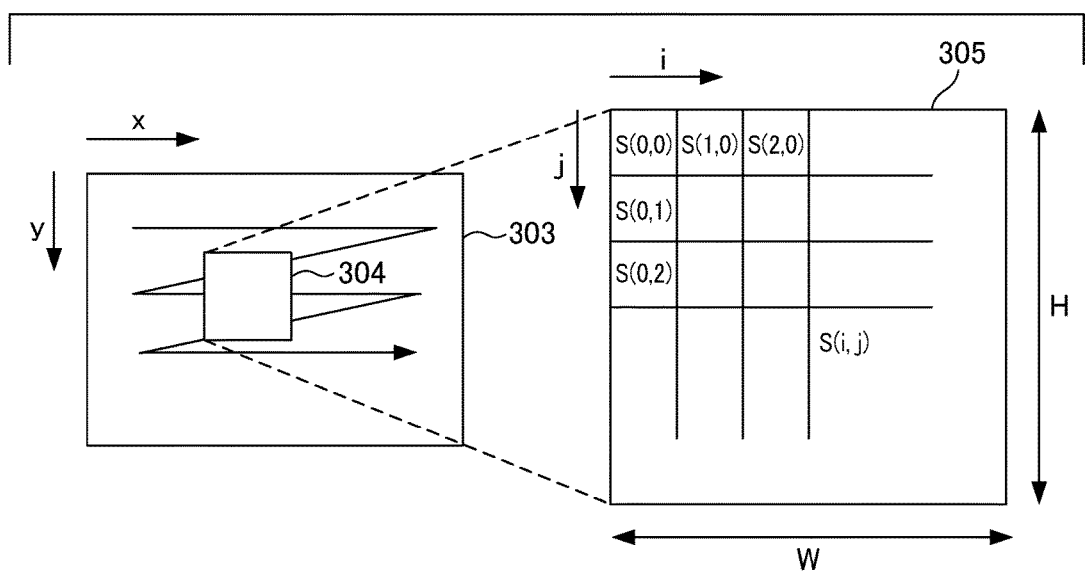

FIG. 3B is a diagram indicative of the information about an image for searching the subject as the target to be tracked. An image 303 is an image in a range in which the matching processing is performed. The coordinate in the searched image is represented by (x, y). A partial area 304 is an area for acquiring an evaluation value for the matching. An amount of characteristic 305 expresses the amount of characteristic of the partial area 304, and the luminance signal of the image data is set as the amount of characteristic, as is the case with the template 301. The amount of characteristic S(i, j) is expressed as a formula (2):

[formula 2]

$$S(i,j)=\{S(0,0),S(1,0),\ldots,S(W-1,H-1)\} \quad (2)$$

wherein the coordinate within the partial area is represented by (i, j), the number of pixels in the horizontal direction is represented by W, and the number of pixels in the perpendicular direction is represented by H.

In an embodiment of the present invention, a value of SAD (Sum of Absolute Difference) is used as a calculating method configured to evaluate similarity between the template 301 and the partial area 304. The SAD value is calculated by formula (3):

[formula 3]

$$V(x,y)=\sum_{y=0}^{H-1}\sum_{x=0}^{W-1}|T(i,j)-S(i,j)| \quad (3)$$

The SAD value V(x, j) is calculated while shifting the partial area 304 by one pixel in order from the upper left of the image 303 of the searched range. The coordinate (x, y), in which the calculated V(x, j) is indicative of the minimum value, shows the position most similar to the template 301. In other words, the position indicative of the minimum value is set as the position having a high possibility that the subject as the target to be tracked is in the searched image.

Note that in an embodiment of the present invention, although one-dimensional information of the luminance signal is used as the amount of characteristic, three-dimensional information such as a signal for brightness, hue, and saturation may be also used as the amount of characteristic. Also, although a description has been given of the SAD value as the calculating method of the evaluation value for the matching, the calculating method that is different therefrom, such as Normalized Cross Correlation, that is NCC (Normalized Correlation Coefficient), may be used.

Figure 4A:
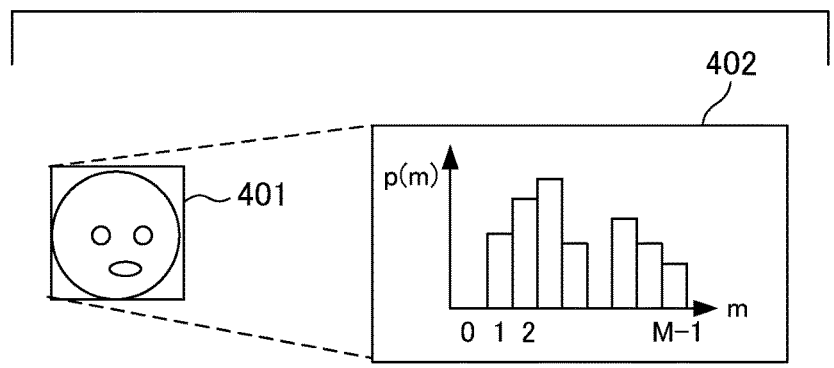
FIG. 4A and FIG. 4B are diagrams for illustrating a histogram matching.

Next, referring to FIG. 4A and FIG. 4B, a detailed description will be given of the histogram matching. FIG. 4A is a diagram illustrating an example of a subject model in the histogram matching. A partial image 401 is a partial image indicative of the subject set as the target to be tacked, and the histogram generated from the pixel data of this partial image 401 is set as the amount of characteristic. An amount of characteristic 402 is expressed by a formula (4), if it is set as the histogram for the M gradation of the luminance signal.

[formula 4]

$$p(m)=\{p(0),p(1),\ldots p(M-1)\} \quad (4)$$

Figure 4B:
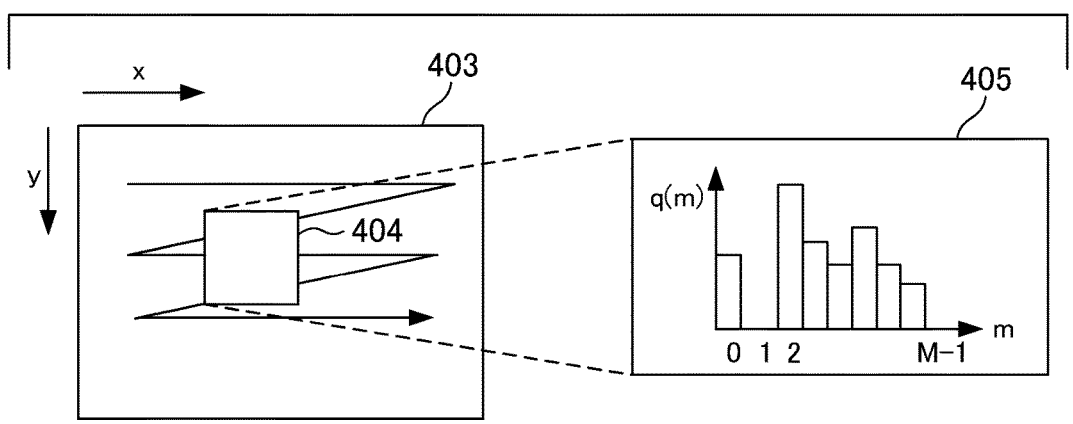

FIG. 4B is a diagram illustrating information of an image for searching the subject as the target to be tracked. An image 403 is an image with a range in which the matching process is performed. The coordinate in the searched image is expressed as (x, y). A partial area 404 is a partial area for acquiring the evaluation value for the matching. An amount of characteristic 405 is expressed as the amount of characteristic generated from the partial area 404, and the amount of characteristic 405 is expressed by a formula (5) if it is set as the histogram for the M gradation of the luminance signal as is the case of the partial image 401.

[formula 5]

$$q(m)=\{q(0),q(1),\ldots q(M-1)\} \quad (5)$$

The Bhattacharyya coefficient is used in a calculating method for estimating similarity between the histogram of the template 301 and that of the partial area 404. The Bhattacharyya coefficient is calculated by formula (6):

[formula 6]

$$D(x,y)=\Sigma_{m=0}^{M-1}\sqrt{p(m)\times q(m)} \quad (6)$$

The Bhattacharyya coefficient D(x, y) is calculated by shifting the partial area 404 by one pixel in order from the upper left of a searched range 403. The coordinate (x, y), in which the calculated D(x, y) is indicative of the maximum value, shows a position most similar to the partial image 401. In other words, the position indicative of the maximum valve is the position having a high possibility that the subject as the target to be tracked is in the searched image.

Here, although one-dimensional information of the luminance signal is described as an example of the amount of characteristic, three-dimensional information such as a signal for brightness, hue, and saturation may be also used as the amount of characteristic. Also, although a description is given of the Bhattacharyya coefficient, the calculating method that is different therefrom, such as the histogram intersection, may be used.

In the image pickup apparatus 100 according to an embodiment of the present invention, the evaluation values and the estimated areas (estimated positions) by template matching and histogram matching determines the subject area. The template matching uses a pattern of the image data as the amount of characteristic. However, it is good at the classification between similar subjects, but weak at changes in appearance. In contrast, the histogram matching does not utilize the image data itself, but the histogram with respect to the amount of characteristic of the matching. Since the histogram matching allows the amount of characteristic to remain ambiguous, although it is good at the changes in appearance, such as the change of the attitude by the subject, it is weak at the classification between the similar subjects.

In the method for tracking the subject, in addition to the method for expressing the amount of characteristic, and that for the collating (matching) thereof as the above the formulae, how to acquire the amount of the characteristic becomes an important element. The method for acquiring the amount of characteristic is indicative of a magnitude of an acquired area, and the update frequency of the amount of characteristic. If the acquired area of the amount of characteristic is larger, the characteristic can be acquired for classifying between the subject as the target to be tracked and other subjects, thereby allowing it to be good at the classification between similar subjects. At the same time, it is likely to cause the change in a time direction to be large, thereby causing it to be weak at changes in the appearance for the subject as the target to be tracked. Since only the local area of the subject as the target to be tracked is set as the target if the acquired area of the amount of characteristic is smaller, the change in the time direction is likely to be small, thereby allowing it to be good at the changes in appearance of the subject as the target to be tracked. At this time, it is difficult to acquire the characteristics for classifying between the subject as the target to be tracked and the other subjects, thereby causing it to be weak at the classification between the similar subjects.

Also, with respect to the update frequency of the amount of characteristic, if the update frequency is high, it causes a shorter time interval between the image at the timing of acquiring the amount of characteristic and the image for the matching processing, thereby allowing the change of the subject as the target to be tracked to be small. In other words, as a result, it becomes good at the changes in appearance in the subject as the target to be tracked. In contrast, for example, if the amount of the characteristic is updated every tracking process, there is a concern that the estimation error for the subject tracking may be included. Therefore, the reliability of the amount of characteristic may be reduced. Thus, the reliability for the amount of characteristic becomes high when the amount of characteristic is updated only if the reliability of the estimation for tracking the subject is high. However, the update frequency of the amount of characteristic becomes reduced, and the time interval between the image at the timing for acquiring the amount of characteristic and the image for the matching processing becomes large, thereby causing the large change of the subject as the target to be tracked. Therefore, it becomes weak at the changes in appearance of the subject as the target to be tracked. In this case, the high reliability of the estimation for tracking the subject is considered in the case for example, in which the subject as the target to be tracked is detected by detecting the subject, and the like.

Taking into account of the properties as described above, in the template matching, the range in which the amount of characteristic is acquired is set small, and the update frequency of the amount of characteristic is set high, thereby allowing a demerit of being poor at the change in appearance in the template matching to be suppressed. In the histogram matching, the range in which the amount of characteristic is set large, and the update frequency of the amount of characteristic is set low, thereby improving the merit of being good at the changes in appearance in the histogram matching.

Next, FIG. 5 illustrates a framework for tracking the subject by the subject tracking circuit 109. Images 501, 502, and 503 are examples of input images that are input by the subject tracking circuit 109. The image 501 is an image in which the subject as the target to be tracked is detected by the subject detecting circuit 201. The image 502 is an image at the time most proximate to the current time among the images to which the subject tracking process has been performed. The image 503 is an image at the current time and an image on which process for estimating the subject area is performed. In a period from the image 501 to the image 502, the subject as the target to be tracked is set so as not to be detected by the subject detecting circuit 201.

Frames 505 and 506 show the estimated area that is estimated by the subject tracking circuit 109. An area 504 is an area estimated by the subject detecting circuit 201, and appears to have high reliability (degree of reliability) as the subject. Therefore, as shown in the partial area 507, the amount of characteristic is acquired from the range larger than the area estimated by the subject detecting circuit 201. A histogram 508 is generated from the partial area 507, and this histogram 508 is registered by the histogram registering circuit 204. A template 509 is the partial area indicative of the result immediately before the subject tracking process and this partial area is registered as the template by the template registering circuit 202. It is noted that at the start of tracking the subject, the area estimated by the subject detecting circuit 201 is registered as the template by the template registering circuit 202.

A searched range 510 is a searched range in the subject tracking process. Histogram matching is carried out with the histogram 508 by the histogram matching circuit 205 with respect to the searched range 510. In parallel with this, template matching is carried out by the template matching circuit 203 using the template 509. Based on each matching result, a subject tracking area 506 is determined by the tracking process controlling circuit 206. In FIG. 5, it is shown that the histogram 508, which is the amount of characteristic for the histogram matching, has a larger range for acquiring the amount of characteristic and a lower update frequency than the template 509, which is the amount of characteristic for the template matching. In other words, the partial area corresponding to the histogram registered by the histogram registering circuit 204 is larger than the partial area corresponding to the template registered by the template registering circuit 202. Also, the update frequency of the histogram registered by the histogram registering circuit 204 is less than that of the template registered by the template registering circuit 202.

Figure 6:
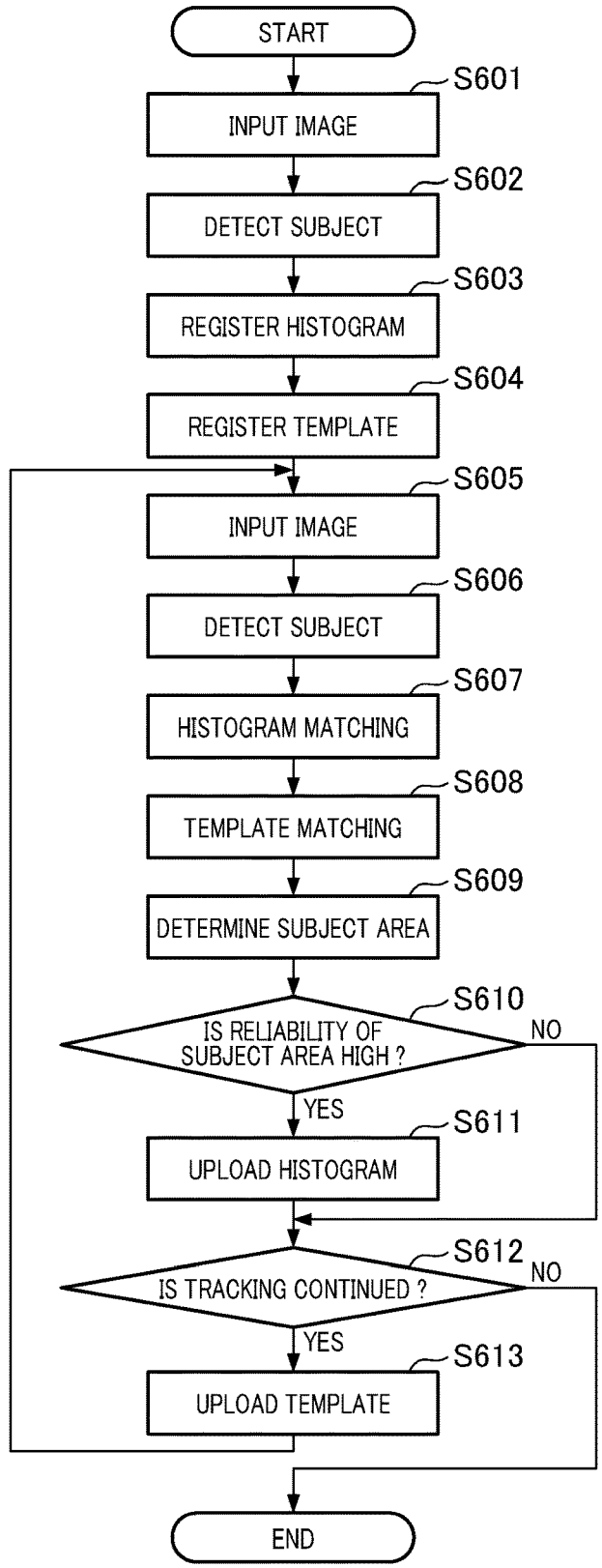
FIG. 6 is a flowchart illustrating a subject tracking process.

Next, referring to FIG. 6, a description will be given of a subject tracking process in an embodiment of the present invention. First, when an image is supplied from the image processing circuit 106 to the subject tracking circuit 109 (step S601), the subject tracking circuit 109 detects the subject in order to determine the subject as a target to be tracked (step S602). The detected subject area is set as the target to be tracked, and then a histogram that is a subject model of the histogram matching (amount of characteristic) is registered based on the partial image indicative of the subject set as the target to be tracked (step S603). Also, the subject tracking circuit 109 registers the partial image indicative of the subject set as the target to be tracked, as the template that is the subject model of the template matching (amount of characteristic) (step S604). In this case, the processing may be stopped, if the subject is not detected, in step S602 (not shown).

Next, the image is supplied (input) from the image processing circuit 106 to the subject tracking circuit 109 (step S605). Note that the input image in step S605 is indicative of the image in the area equivalent to the searched image by the subject tracking circuit 109, and the input image in step S601 is different from that in step S605 with respect to the time. Next, the detection of the subject is performed based on the input image in step S605 (step S606). Subsequently, histogram matching (step S607) is performed and then, the template matching (step S608) is performed. Following this, the subject area is determined based on the result of the subject detection, the evaluation values of the histogram matching, and the template matching, and the area information thereof (step S609).

Figure 7:
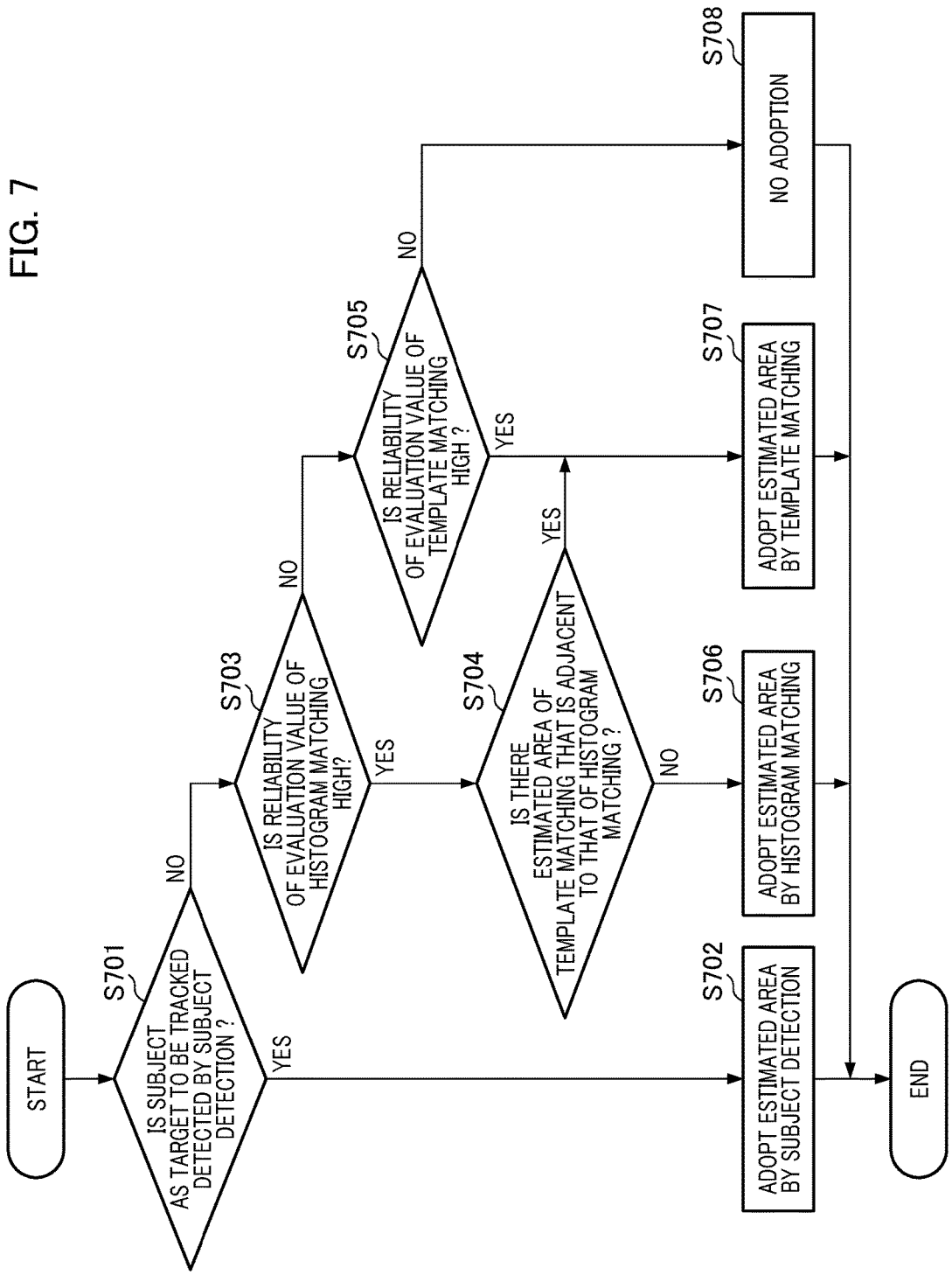
FIG. 7 is a flowchart illustrating subject area determination processing.

Here, referring to FIG. 7, a description will be given of a flow of subject area determination processing in step S609. First, the subject tracking circuit 109 determines whether or not the subject as the target to be tracked is detected by the subject detection (step S701). If the subject as the target to be tracked is detected in step S701 (YES), the estimated area by the subject detection is adopted as the subject area (step S702). On the other hand, if the subject as the target to be tracked is not detected (NO), the step proceeds to step S703, and then, it is determined whether or not the reliability (degree of reliability) for the evaluation value of the histogram matching is high. In the determination for the reliability, for example, if the maximum value of the Bhattacharyya coefficient $D(x, y)$ by the formula (6) is greater than or equal to a predetermined threshold, the reliability is determined to be high, and if the maximum value of the Bhattacharyya coefficient $D(x, y)$ is less than the predetermined threshold, the reliability is determined to be low.

In step S703, if the reliability for the evaluation value of the histogram matching is high (YES), the step proceeds to step S704, and then it is determined whether or not there is the estimated area of the template matching adjacent to the estimate area of the histogram matching. This determination calculates a distance between the coordinate $(x, y)$ that is the maximum value of the Bhattacharyya coefficient $D(x, y)$ by the formula (6) and the coordinate $(x, y)$ that is the minimum value of the SAD value $V(x, y)$ by the formula (3), and then, determines the proximity therebetween based on whether or not the calculated distance is within the predetermined range. In step S704, if there is no estimated area of the template matching adjacent to the estimated distance of the histogram matching (NO), the step proceeds to step S706, and then the estimated area by the histogram matching is adopted. In other words, the coordinate $(x, y)$ that is the maximum value of the Bhattacharyya coefficient $D(x, y)$ by the formula (6) is determined as the position of the subject. On the other hand, if there is the estimated area of the template matching adjacent to the estimated distance of the histogram matching (YES), the step proceeds to step S707, and then, the estimated area by the template matching is adopted. If there is the estimate area by the template matching adjacent to the estimated area of the histogram matching with the high reliability, it is contemplated that the estimated area by the template matching has also the high reliability. Also, since it is contemplated that the template matching has higher precision for the position of the estimated area than the histogram matching, the estimated area of the template matching is adopted in this case.

In contrast, in step S703, if the reliability for the evaluation value of the histogram matching is low (NO), the step proceeds to step S705, and it is determined whether or not the reliability for the evaluation value of the template matching is high (step S705). The determination for the reliability determines the reliability to be high if the minimum value of the SAD value $V(x, y)$ by the formula (3) is less than the predetermined threshold, and determines the reliability to be low if the minimum value of the SAD value V(x, y) is greater than or equal to the predetermined threshold.

In step S705, if the reliability for the evaluation value of the template matching is high (Yes), the step proceeds to step S707. Then the estimated area by the template matching is adopted (step S707). In other words, the coordinate (x, y) that is the minimum value of the SAD value V(x, y) by the formula (3) is determined to be the position of the subject. In contrast, if the reliability for the evaluation value of the template matching is low in step S705 (NO), the step proceeds to step S708 and neither of the estimation value of the template matching nor the histogram matching is adopted.

Referring back to FIG. 6, when the subject area is determined in step S609, the subject tracking circuit 109 performs the update processing of the subject model (amount of characteristic). Next, it is determined whether or not the reliability for the subject area determined in step S610 is high. If the reliability is high in step S610 (YES), the histogram is updated (step S611). In contrast, if the reliability is not high (low) (NO), the histogram is not updated. Note that as the method configured to determine the reliability in step S610, the reliability is set high if the subject as the target to be tracked is detected by the subject detection in step S606, while the reliability is set low if the subject as the target to be tracked is not detected by the subject detection in step S606. In other words, the reliability may be determined to be high if the estimated area by the subject detection is adopted as the subject area by step S702, and it may be determined to be low in the other cases.

Next, the subject tracking circuit 109 determines whether or not the tracking of the subject is continued (step S612). This determination determines that the tracking is not continued if the estimated areas of the template matching and the histogram matching are not collectively adopted, as, for example, in step S708. On the other hand, the tracking is continued if the estimated area of either template matching or the histogram matching is adopted as in step S706 and step S707. In step S612, if the tracking is not continued (NO), the processing for tracking the subject is completed. In other words, the processing is completed if the subject as the target to be tracked is not in the image of the searched range. On the other hand, in step S612, if the tracking is continued (YES), the template is updated based on the estimated subject area (step S613). Then, back to step S605, the processing is repeatedly carried out based on the sequentially supplied images. In this manner, the histogram used in the histogram matching is updated only when the reliability for the subject area is determined as high, even if the tracking has succeeded, while the template used in the template matching is updated for every successful tracking.

Note that the template in the template matching and the acquired area of the histogram in the histogram matching are determined based on the area as the result of the subject detection or the subject tracking. Also, although the magnitude of the template in the template matching is equivalent to the detected area that is detected by the subject detection, the magnitude of the acquired area of the histogram in the histogram matching is larger than the area detected by the subject detection. If the magnitude of the acquired area of the histogram is set as the area that simply expands with respect to the area detected by the subject detection, the acquired area may include the area that is different from the subject as the target to be tracked, such as the background in the acquired area. In this case, since the precision of the subject tracking may be reduced, it is necessary to optimize the acquired area of the histogram.

Here, the optimized processing for the acquired area of the histogram determines the acquired area in accordance with the case of the distribution for pixel information that is included in the detected area by the subject detection and does not expand out of the area of the subject. Here, referring to FIG. 8, a description will be given of a flow of the processing for optimizing the acquired area of the histogram by an optimizing unit (not shown). First, clustering is performed on the image information for acquiring the histogram (step S801). This step is to make image information that is multi-dimensional into lower-dimensional image information by the clustering to allow the suppression for the effect of noise and facilitate the handling of the information in the subsequent steps. As the method for the clustering, for example, general methods such as K-means may be applied.

Next, a labeling process is performed based on a clustering image (step S802). In the labeling process, the same labeling is assigned to the same class of the pixel information whose positions are consecutive (are adjacent vertically or horizontally). Next, with respect to a labeling image, a label included in a first predetermined area is set as a valid label, and a label not included in the first predetermined area is set as an invalid label (step S803). It is noted that the first predetermined area is determined based on the detected area of the subject as the target to be tracked by the subject detection.

Next, with respect to the valid label, a pixel not included outside of a second predetermined area different from the first predetermined area (that is, within the second predetermined area) is set as the valid label, ant a pixel included outside of the second predetermined area (that is, out of the second predetermined area) is set as the invalid label (step S804). Note that in an embodiment of the present invention, the second predetermined area is set larger than the first predetermined area. Next, fitting is performed on the area based on the case of the distribution for the valid label (step S805). Area fitting alters the rectangular shape such that there are a lot of pixels that are the valid labels and a small number of pixels that are the invalid labels, as an example.

Next, it is determined whether or not the estimated area satisfies a predetermined condition (step S806). If the estimated area satisfies the predetermined condition (YES), the histogram is updated based on the estimated area (step S807). If the estimated area does not satisfy the predetermined condition (NO), the histogram is not updated and the processing is stopped. For example, if the estimated area is smaller than a predetermined threshold, or the estimated area is larger than the predetermined threshold, the histogram is not updated. That is, even if the processing proceeds to step S611 as the reliability for the subject area is determined to be high in step S610, the histogram is not updated if the estimated area does not satisfy the predetermined condition. By the above processing, the reduction in the precision of the tracking can be prevented by optimizing the acquired area of the histogram.

As described above, the image processing apparatus according to an embodiment of the present invention can be provided such that the performance for tracking the subject can be improved by optimizing the acquired range of the characteristics and the update frequency in accordance with the properties of each matching, while combining the histogram matching with the template matching.

Note that in an embodiment of the present invention, the subject tracking apparatus is applied to the image pickup apparatus, however, the device applying the subject tracking apparatus is not limited to the image pickup apparatus. For example, the subject tracking apparatus may be applied to a display device configured to display the image (replay data) supplied from an external device, the record medium, and the like. Note that in the display device, the subject tracking process is performed as the replay data is set as the data of the subject tracking process. In this case, the control circuit such as the microcontroller in the display device controls a displaying condition in displaying the image, based on the information about the subject extracted by the subject tracking process (the position, magnitude, and the like of the subject in the image). More specifically, information representing the subject, such as a frame, is displayed superimposed on the position of the subject in the image, or control of the luminance, color shade for displayed images and the like is exercised in accordance with the luminance or color information of the subject portion.

Other Embodiments

Embodiment(s) of the present invention can also be realized by a computer of a system or apparatus that reads out and executes computer executable instructions (e.g., one or more programs) recorded on a storage medium (which may be also referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-119267, filed Jun. 12, 2015, which is hereby incorporated by reference wherein in its entirety.

What is claimed is:

1. A subject tracking apparatus that tracks a subject included in images that are sequentially supplied, the apparatus comprising:
   one or more processors; and
   a memory storing instructions which, when the instructions are executed by the one or more processors, cause the subject tracking apparatus to function as units comprising:
      a first registering unit configured to register a partial area indicative of the subject in one image of the supplied images as a template;
      a first matching unit configured to estimate a subject area by collating a partial area in a newly supplied image with the template registered by the first registering unit;
      a second registering unit configured to generate a histogram based on pixel values of a partial area indicative of the subject in one image of the supplied images and register the generated histogram;
      a second matching unit configured to estimate a subject area by collating a histogram based on pixel values of a partial area in a newly supplied image with the histogram registered by the second registering unit; and
      a tracking area determination unit configured to determine a tracking area based on either of a first area that is the subject area estimated by the first matching unit or a second area that is the subject area estimated by the second matching unit,
      wherein the partial area of which the second registering unit generates the histogram based on the pixel values is larger than the partial area registered as the template by the first registering unit.

2. The subject tracking apparatus according to claim 1, wherein the second registering unit comprises an optimizing unit configured to optimize a partial area for acquiring a histogram to be registered, and
   wherein the optimizing unit optimizes the partial area in accordance with a condition of a distribution of pixel information included in the partial area indicative of the subject and the pixel information being not expanding out of the area of the subject.

3. The subject tracking apparatus according to claim 1, wherein the tracking area determination unit determines either of a first area that is the subject area estimated by the first matching unit or a second area that is the subject area estimated by the second matching unit as the tracking area, in accordance with reliability for the collation by the first matching unit and the second matching unit.

4. The subject tracking apparatus according to claim 3, wherein the tracking area determination unit determines the second area as the tracking area if the reliability of the collation by the second matching unit is high.

5. The subject tracking apparatus according to claim 3, wherein the tracking area determination unit determines the first area as the tracking area if the reliability of the collation by the second matching unit is high and the first area is adjacent to the second area.

6. The subject tracking apparatus according to claim 3, wherein the tracking area determination unit determines the first area as the tracking area if the reliability of the collation by the second matching unit is low and the reliability of the collation by the first matching unit is high.

7. The subject tracking apparatus according to claim 1, wherein the second registering unit generates the histogram based on the luminance of the pixels included in the partial area indicative of the subject.

8. The subject tracking apparatus according to claim 1, wherein the second registering unit generates the histogram based on the brightness, hue, and saturation of the pixels included in the partial area indicative of the subject.

9. An image pickup apparatus comprising:
an imaging element configured to sequentially photoelectorically convert images of a subject to output captured images;
one or more processors; and
a memory storing instructions which, when the instructions are executed by the one or more processors, cause the image pickup apparatus to function as units comprising:
a first registering unit configured to register a partial area indicative of the subject in one image of the supplied images as a template;
a first matching unit configured to estimate a subject area by collating a partial area in a newly supplied image with the template registered by the first registering unit;
a second registering unit configured to generate a histogram based on pixel values of a partial area indicative of the subject in one image of the supplied images and register the generated histogram;
a second matching unit configured to estimate a subject area by collating a histogram based on pixel values of a partial area in a newly supplied image with the histogram registered by the second registering unit;
a tracking area determination unit configured to determine a tracking area based on either of a first area that is the subject area estimated by the first matching unit or a second area that is the subject area estimated by the second matching unit; and
a controlling unit configured to control an image capturing condition in image capture by the imaging element, in accordance with information about the subject by the tracking area determination unit,
wherein the partial area of which the second registering unit generates the histogram based on the pixel values is larger than the partial area registered as the template by the first registering unit.

10. A control method for controlling a subject tracking apparatus that tracks a subject included in images that are sequentially supplied, the method comprising:
registering, by a first registering unit, a partial area indicative of the subject in one image of the supplied images as a template;
generating, by a second registering unit, a histogram based on pixel values of a partial area indicative of the subject in one image of the supplied images and registering the generated histogram;
estimating, by a first matching unit, a subject area by collating a partial area in a newly supplied image with the template registered by the first registering unit;
estimating, by a second matching unit, a subject area by collating a histogram based on pixel values of a partial area in a newly supplied image with the histogram registered by the second registering unit; and
determining, by a tracking area determination unit, a tracking area based on either of a first area that is the subject area estimated by the first matching unit or a second area that is the subject area estimated by the second matching unit,
wherein the partial area of which the second registering unit generates the histogram based on the pixel values is larger than the partial area registered as the template by the first registering unit.

11. An image processing apparatus that tracks a subject included in images that are sequentially input, the apparatus comprising:
one or more processors; and
a memory storing instructions which, when the instructions are executed by the one or more processors, cause the image processing apparatus to function as units comprising:
a subject detecting unit configured to detect a subject set as a target to be tracked from the input images;
a first registering unit configured to register a partial area indicative of the detected subject set as the target to be tracked as a template;
a first matching unit configured to estimate a first area with a high degree of similarity by collating each area of the partial area in the sequentially input images with the template registered by the first registering unit;
a second registering unit configured to register a histogram of a partial area indicative of the detected subject set as the target to be tracked;
a second matching unit configured to estimate a second area with the high degree of similarity by collating a histogram based on pixel values of a partial area of the sequentially input images with the histogram registered by the second registering unit; and
a tracking area determination unit configured to determine a tracking area based on either of the first area or the second area,
wherein the partial area corresponding to the histogram registered by the second registering unit is the partial area larger than the partial area corresponding to the template registered by the first registering unit.

12. The subject tracking apparatus according to claim 1, wherein the second matching unit collates each gradation of the histogram in the newly supplied image with that of the histogram registered by the second registering unit to estimate the subject area.

13. The subject tracking apparatus according to claim 1, wherein an update for the registration of the template by the first registering unit is more frequent than that for the registration of the histogram by the second registering unit.

14. The image pickup apparatus according to claim 9, wherein the second matching unit collates each gradation of the histogram in the newly supplied image with that of the histogram registered by the second registering unit to estimate the subject area.

15. The image pickup apparatus according to claim 9, wherein an update for the registration of the template by the first registering unit is more frequent than that for the registration of the histogram by the second registering unit.

16. The control method according to claim 10, wherein, in the estimating by the second matching unit, each gradation of the histogram in the newly supplied image is collated with that of the histogram registered by the second registering unit to estimate the subject area.

17. The control method according to claim 10, wherein an update for the registration of the template by the first registering unit is more frequent than that for the registration of the histogram by the second registering unit.

18. The image processing apparatus according to claim 11, wherein the second matching unit collates each gradation of the histogram in the sequentially input images with that of the histogram registered by the second registering unit to estimate the subject area.

19. The image processing apparatus according to claim 11, wherein an update for the registration of the template by the first registering unit is more frequent than that for the registration of the histogram by the second registering unit.

* * * * *